United States Patent
Sachs

(10) Patent No.: US 8,015,993 B2
(45) Date of Patent: Sep. 13, 2011

(54) HEATABLE HYDROGEN PRESSURE REGULATOR

(75) Inventor: Christian Sachs, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 1723 days.

(21) Appl. No.: 10/967,889

(22) Filed: Oct. 18, 2004

(65) Prior Publication Data

US 2006/0081290 A1    Apr. 20, 2006

(51) Int. Cl.
*F02B 3/00*    (2006.01)
(52) U.S. Cl. ......................... 137/340; 137/341
(58) Field of Classification Search .................. 137/340, 137/341; 62/51.2
See application file for complete search history.

(56) References Cited

U.S. PATENT DOCUMENTS

| | | | |
|---|---|---|---|
| 1,662,263 A | | 3/1928 | Harrua |
| 1,943,047 A | | 7/1932 | Updegraff |
| 3,664,134 A | * | 5/1972 | Seitz .................. 60/274 |
| 4,537,172 A | * | 8/1985 | Kanehara et al. ............. 123/527 |
| 4,684,786 A | * | 8/1987 | Mann et al. .................... 137/341 |
| 5,267,447 A | | 12/1993 | Yamomoto |
| 5,356,589 A | * | 10/1994 | Sugalski ........................ 264/265 |
| 5,408,957 A | * | 4/1995 | Crowley ................... 123/27 GE |
| 6,588,253 B2 | * | 7/2003 | Lambert et al. ............... 137/341 |
| 6,816,669 B2 | * | 11/2004 | Zimmer et al. ............... 392/397 |
| 2004/0081861 A1 | * | 4/2004 | Parchamazad .................. 429/12 |
| 2005/0241632 A1 | | 11/2005 | Alfoldi et al. |

FOREIGN PATENT DOCUMENTS

EP    1 589 280 A1    10/2005

* cited by examiner

*Primary Examiner* — John Fox
(74) *Attorney, Agent, or Firm* — John A. Miller; Miller IP Group, PLC

(57) ABSTRACT

A compressed hydrogen tank system that includes a heatable hydrogen pressure regulator. Hydrogen is removed from the compressed tank through a suitable pipe where the pressure drop of the hydrogen is controlled by the pressure regulator. The high pressure side of the regulator is typically at a relatively low temperature as the hydrogen is being removed from the tank, and the low pressure side of the regulator is typically at a relatively high temperature as the hydrogen is removed from the tank. A heat source is provided to heat the pipe on the high pressure side of the regulator to prevent the hydrogen from becoming cold as the hydrogen is being removed from the tank, thus preventing the temperature of the hydrogen within the tank from decreasing.

20 Claims, 1 Drawing Sheet

HEATABLE HYDROGEN PRESSURE REGULATOR

BACKGROUND OF THE INVENTION

1. Field of the Invention

This invention relates generally to a pressure regulator for a compressed gas tank and, more particularly, to a pressure regulator for a compressed gas tank, where the pressure regulator includes a heater at a high pressure side of the regulator to reduce cooling of the gas within the tank as it is removed therefrom.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power. For example, a typical fuel cell stack for a vehicle may have two hundred stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

Usually hydrogen is stored in its gaseous state in a compressed gas tank under high pressure on the vehicle to provide the hydrogen necessary for the fuel cell system. The pressure in the compressed tank can be upwards of 700 bar. The compressed tank typically includes an inner plastic liner that provides a gas tight seal for the hydrogen, and an outer carbon fiber composite layer that provides the structural integrity of the tank. Because hydrogen is a very light and diffusive gas, the inner liner must be carefully engineered in order to act as a permeation barrier. The hydrogen is removed from the tank through a pipe. At least one pressure regulator is provided in the pipe that reduces the pressure of the hydrogen within the tank to a pressure suitable for the fuel cell system.

As the hydrogen is removed from the compressed tank through the regulator, the kinetic energy from the acceleration and deceleration of the hydrogen molecules as a result of forcing the hydrogen through the regulator causes the temperature of the hydrogen in the pipe at the high pressure side of the regulator to decrease. The temperature of the hydrogen in the pipe operates to cool the hydrogen within the tank. In addition, the hydrogen on the low pressure side of the regulator is warmed by the inverse Joule-Thompson effect. If the temperature of the hydrogen within the tank decreases beyond a certain temperature, such as $-40°$ C., the inner liner and the tank seals become brittle and damaged, thus affecting the tank's gas tight performance. Therefore, there are limits as to how fast hydrogen and/or for how long hydrogen can be removed from the compressed tank in a fuel cell system.

When the hydrogen in the tank is cooled, the various piping, heat radiation and the like will cause the tank to warm back up. However, it would be beneficial to provide a technique for warming the hydrogen in the high pressure portion of the pipe so that the limits as to how fast and for how long the hydrogen can be removed from the tank can be significantly reduced or eliminated.

SUMMARY OF THE INVENTION

In accordance with the teachings of the present invention, a compressed hydrogen tank system is disclosed that includes a heatable hydrogen pressure regulator. Hydrogen is removed from the compressed tank through a suitable pipe where a pressure drop of the hydrogen is controlled by the pressure regulator. The high pressure side of the regulator is typically at a relatively low temperature as the hydrogen is being removed from the tank, and the low pressure side of the regulator is typically at a relatively high temperature as the hydrogen is removed from the tank. A heat source is provided to heat the pipe on the high pressure side of the regulator to prevent the hydrogen from becoming cold as the hydrogen is being removed from the tank, thus preventing the temperature of the hydrogen within the tank from decreasing.

In one embodiment, an electrical coil is wrapped around the pipe on the high pressure side of the regulator and a current is passed through the coil to provide resistive heating of the pipe. Alternately, an external cooling fluid can be run through a heat exchanger coupled to the high pressure side of the pipe, where the cooling fluid is used to heat the pipe. In another embodiment, the low pressure side of the pipe is wrapped around the high pressure side of the pipe to use the low pressure warm hydrogen to heat the high pressure cool hydrogen.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a compressed hydrogen tank system employing a heatable hydrogen pressure regulator is merely exemplary in nature, and is in no way intended to limit the invention or its applications or uses. For example, the heatable hydrogen pressure regulator of the invention is discussed herein in association with a compressed hydrogen tank for a fuel cell system on a vehicle. However, the heatable pressure regulator of the invention has application for other types of tanks for storing other gases for other uses.

Figure 1:
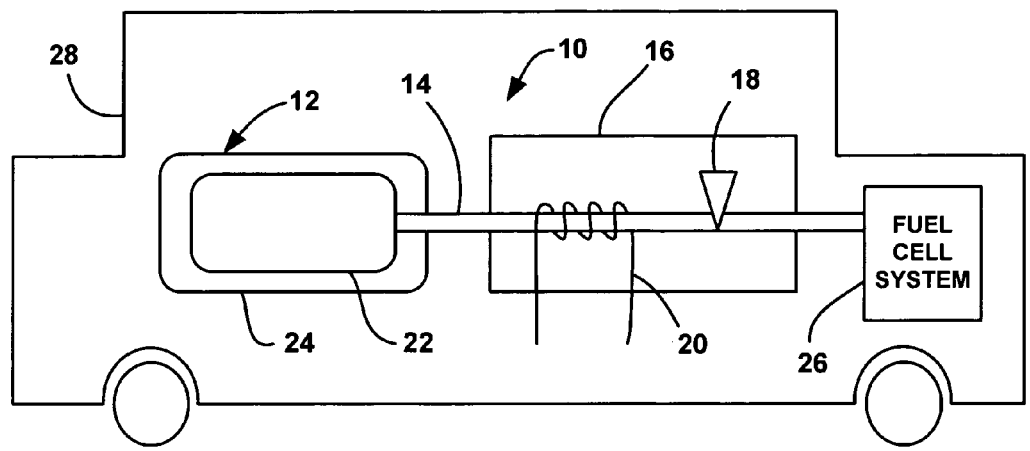
FIG. 1 is a plan view of a compressed hydrogen tank system employing a heatable pressure regulator, according to one embodiment of the present invention.

FIG. 1 is a plan view of a compressed gas tank system 10 including a tank 12 for storing a compressed gas under pressure, such as hydrogen for a fuel cell system 26 on a vehicle 28. Additional valves upstream of the pressure regulator 18 are not shown. The tank 12 includes a suitable inner liner 22 that provides a permeation barrier and an outer structural layer 24. Hydrogen is withdrawn from the tank 12 through a pipe 14 where a pressure regulator assembly 16 controls the pressure drop. The pressure regulator assembly 16 includes a pressure regulator 18, such as a proportional valve, that is selectively opened and closed to control the flow rate of the hydrogen through the pipe 14, as is well understood in the art. The high pressure hydrogen in the pipe 14 between the pressure regulator 18 and the tank 12 is usually at a relatively low temperature, and the low pressure hydrogen on the opposite side of the pressure regulator 18 is usually at a relatively high temperature as the hydrogen is being removed from the tank 12.

Because the hydrogen within the pipe 14 is relatively cool adjacent to the tank 12, the temperature of the hydrogen within the tank 12 is reduced, possibly affecting the ability of the tank system 10 to remove hydrogen from the tank 12 without damaging the liner layer 22 of the tank 12, as discussed above.

According to one embodiment of the invention, a wire 20 is wrapped around the pipe 14 within the pressure regulator assembly 16 on the high pressure side of the regulator 18. An electrical current is applied to the wire 20 to provide resistive heating to heat the pipe 14 to prevent the hydrogen within the pipe 14 from cooling down as it is being removed from the tank 12. By providing a heat source in this manner, the hydrogen within the tank 12 will not cool down to a temperature that would affect the flow rate and time limits for removing hydrogen from the tank 12.

According to another embodiment of the present invention, the wire 20 is replaced with a fluid channel wound around the pipe 14. A warming fluid, such as water or other suitable fluid, is directed through the fluid channel to heat the pipe 14 for the same purposes. Also, thermal reservoirs can be provided to remove heat from the pipe 14 at the high pressure side of the regulator 18.

Figure 2:
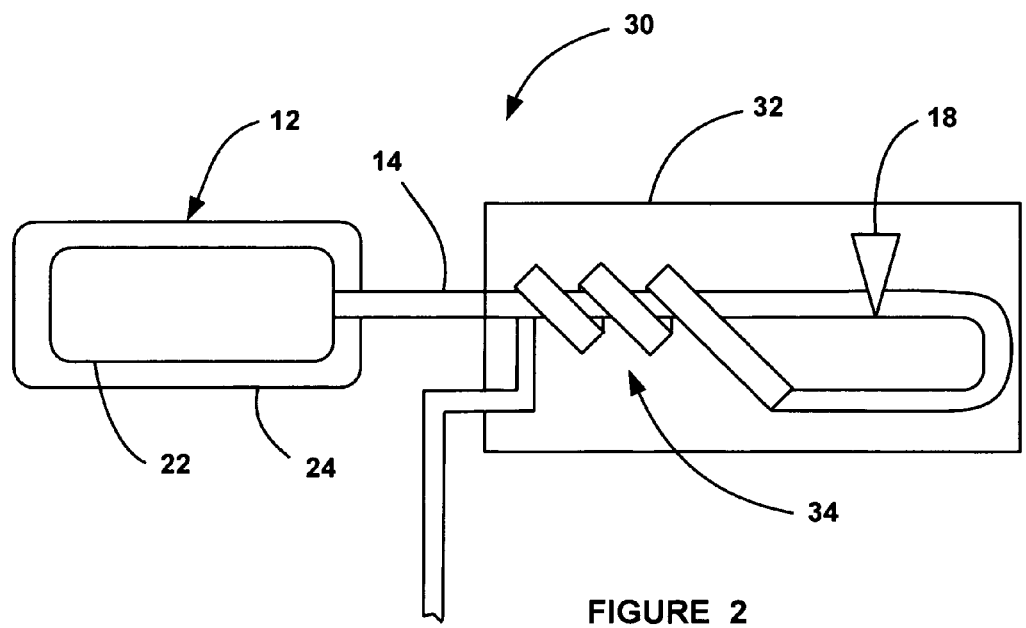
FIG. 2 is a plan view of a compressed hydrogen tank system employing a heatable pressure regulator, where the high temperature, low pressure hydrogen is used to heat the high pressure, low temperature hydrogen.

FIG. 2 is a plan view of a compressed hydrogen tank system 30, according to another embodiment of the present invention, where like components are identified by the same reference numeral as in the tank system 10. The tank system 30 includes a pressure regulation assembly 32 having the pressure regulator 18 discussed above, where the valves upstream of the pressure regulator 18 are not shown. In addition, the pressure regulator assembly 32 includes a heat exchanger 34 that uses the pipe 14 on the warm side of the pressure regulator 18 to heat the pipe 14 on the high pressure side of the regulator 18. Particularly, the pipe 14 is made of a material so that it can be wrapped around itself, as shown, so that the warm hydrogen in the low pressure side of the pipe 14 provides heat to the high pressure side of the pipe 14 for the reasons discussed above. The thermal contact of the warm side of the pipe 14 can be provided with or without additional insulation to the environment.

With the designs discussed above, the cooling of the hydrogen remaining in the tank 12 is significantly reduced.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A compressed tank system comprising:
 a tank holding a compressed gas at a pressure up to 700 bar or greater;
 a pipe coupled to the tank for allowing the compressed gas to be removed therefrom;
 a pressure regulator for controlling the flow of gas through the pipe from the tank by reducing the pressure of the gas from the tank; and
 a heat source directly coupled to the pipe between the tank and the pressure regulator, said heat source heating the pipe for preventing the gas within the pipe from cooling down as it is being removed from the tank as a result of the decrease in pressure of the gas caused by the regulator.

2. The tank system according to claim 1 wherein the heat source is an electrical coil wrapped around the pipe that is responsive to an electrical current to provide resistive heating to the pipe.

3. The tank system according to claim 1 wherein the heat source is a flow channel wrapped around the pipe that is responsive to a heated fluid for transferring heat to the pipe.

4. The tank system according to claim 1 wherein the heat source is a thermal reservoir provided in contact with the pipe.

5. The tank system according to claim 1 wherein the heat source is a portion of the pipe on a low pressure side of the regulator that is wrapped around a portion of the pipe on the high pressure side of the regulator.

6. The tank system according to claim 1 wherein the compressed gas is hydrogen.

7. The tank system according to claim 6 wherein the tank system is associated with a fuel cell system on a vehicle.

8. The tank system according to claim 1 wherein the tank includes an inner plastic liner.

9. A compressed tank system comprising:
 a tank holding a compressed gas at a pressure up to 700 bar or greater;
 a pipe coupled to the tank for allowing the compressed gas to be removed therefrom; and
 a heat source directly coupled to the pipe for heating the pipe for preventing the gas within the pipe from cooling down as it is being removed from the tank.

10. The tank system according to claim 9 wherein the heat source is an electrical coil wrapped around the pipe that is responsive to an electrical current to provide resistive heating to the pipe.

11. The tank system according to claim 9 wherein the heat source is a flow channel wrapped around the pipe that is responsive to a heated fluid for transferring heat to the pipe.

12. The tank system according to claim 9 wherein the heat source is a thermal reservoir provided in contact with the pipe.

13. The tank system according to claim 9 wherein the heat source is a portion of the pipe wrapped around another portion of the pipe.

14. The tank system according to claim 9 wherein the compressed gas is hydrogen.

15. The tank system according to claim 14 wherein the tank system is associated with a fuel cell system on a vehicle.

16. A compressed tank system for a fuel cell system on a vehicle, said tank system comprising:
 a tank holding a compressed hydrogen gas at a pressure up to 700 bar or greater, said tank including an inner plastic liner;
 a pipe coupled to the tank for allowing the compressed gas to be removed therefrom;

a pressure regulator for controlling the flow through the pipe from the tank by reducing the pressure of the as from the tank; and a heat source directly coupled to the pipe between the tank and the pressure regulator, said heat source heating the pipe for preventing the gas within the pipe from cooling down as it is being removed from the tank as a result of the decrease in pressure of the gas caused by the regulator.

17. The tank system according to claim 16 wherein the heat source is an electrical coil wrapped around the pipe that is responsive to an electrical current to provide resistive heating to the pipe.

18. The tank system according to claim 16 wherein the heat source is a flow channel wrapped around the pipe that is responsive to a heated fluid for transferring heat to the pipe.

19. The tank system according to claim 16 wherein the heat source is a thermal reservoir provided in contact with the pipe.

20. The tank system according to claim 16 wherein the heat source is a portion of the pipe on a low pressure side of the regulator that is wrapped around a portion of the pipe on the high pressure side of the regulator.

* * * * *